May 3, 1966  J. H. ALTSEIMER  3,249,306
AUTOMATICALLY ADJUSTABLE ROCKET NOZZLE
Filed Sept. 14, 1962  3 Sheets-Sheet 1
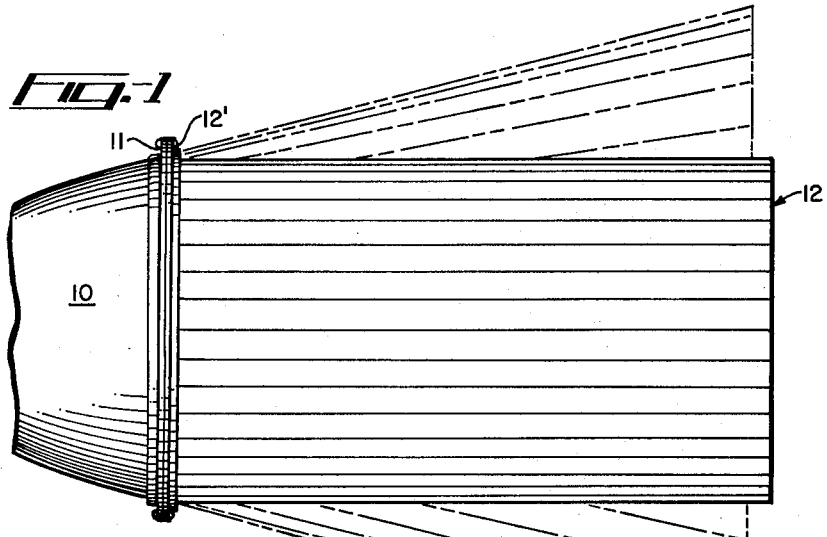
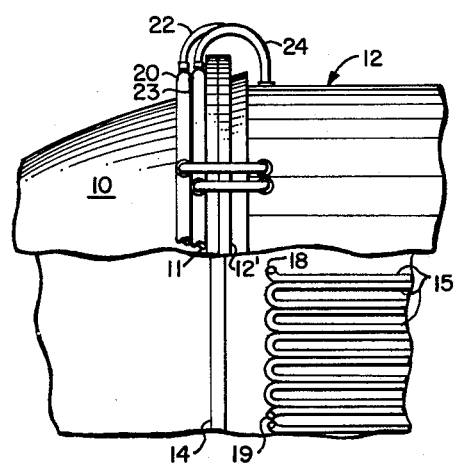
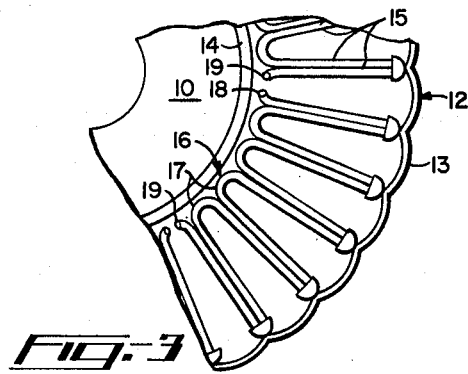
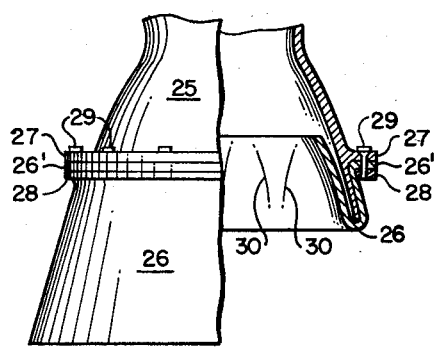
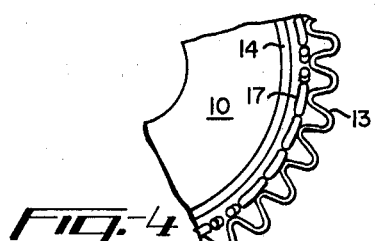
INVENTOR.
JOHN H. ALTSEIMER
BY
ATTORNEY May 3, 1966  J. H. ALTSEIMER  3,249,306
AUTOMATICALLY ADJUSTABLE ROCKET NOZZLE
Filed Sept. 14, 1962  3 Sheets-Sheet 2

INVENTOR.
JOHN H. ALTSEIMER
BY
ATTORNEY

May 3, 1966  J. H. ALTSEIMER  3,249,306
AUTOMATICALLY ADJUSTABLE ROCKET NOZZLE
Filed Sept. 14, 1962  3 Sheets-Sheet 3

INVENTOR.
JOHN H. ALTSEIMER
BY
ATTORNEY

United States Patent Office 3,249,306
Patented May 3, 1966

3,249,306
AUTOMATICALLY ADJUSTABLE ROCKET
NOZZLE
John H. Altseimer, Carmichael, Calif., assignor to Aerojet-General Corporation, Azusa, Calif., a corporation of Ohio
Filed Sept. 14, 1962, Ser. No. 223,646
8 Claims. (Cl. 239—127.1)

The present invention relates to rocket engines and particularly to the provision of automatically expandable nozzles for such engines.

To obtain maximum efficiency from a rocket engine, the nozzle thereof requires to be designed to meet special conditions and such conditions cannot be met satisfactorily by using a nozzle of fixed size particularly in rockets designed for flight to high altitudes or into outer space.

The pressure of the atmosphere becomes less with height, for instance, and a vacuum exists beyond the earth's atmosphere. A rocket exhaust nozzle has the maximum efficiency at any altitude when the nozzle gas pressure at the nozzle exit is exactly equal to the atmospheric pressure. The exit nozzle gas pressure decreases as the ratio of nozzle exit to nozzle throat area increases. Therefore, as a rocket rises to higher altitudes, it is beneficial to have the nozzle area ratio increase so that the exit pressure continuously equals the atmospheric pressure.

High altitude and space rockets are built up of a number of stages and, since the lowest possible dead weight should be carried, an expandable rocket nozzle that can be fitted into a smaller than usual rocket casing is a desirable feature.

It is an object of the present invention to provide an automatically adjustable nozzle construction for a rocket engine, the size of the nozzle increasing to a maximum nozzle diameter as the ambient pressure decreases.

A further object of the invention is to provide an automatically adjustable nozzle construction for a rocket engine and provide means for taking axial loads on the nozzle, which means may also be arranged to carry fluids utilized to cool the nozzle.

Another object of the invention is to provide a rocket engine nozzle construction which may be reduced in length as well as in diameter before firing of the rocket.

An additional object of the present invention is to provide thrust vector control means for an automatically adjustable nozzle which nozzle is adapted to increase in diameter as ambient pressure decreases.

Still further objects and features of the invention will hereinafter appear from the following description read together with the accompanying illustrative drawings, wherein:

FIG. 1 is a side view of an adjustable rocket engine nozzle incorporating the novel features of the invention, indicating the variation in the diameter of the exhaust end of the nozzle, the full lines showing the adjustable portion of the nozzle in retracted or firing position and the dotted lines indicating partial and fully expanded positions;

FIG. 2 is a fragmentary side elevation of the adjustable nozzle shown in FIG. 1 but drawn on a larger scale, the upper portion of the figure showing the outside of the nozzle while the lower portion of the figure shows the inside of the nozzle lined with cooling tubes;

FIG. 3 is a fragmentary rear end view of the nozzle construction of FIG. 2 but shown in expanded position;

FIG. 4 is a fragmentary forward end view of the nozzle construction shown in FIG. 2 shown in retracted condition;

FIG. 5 is a fragmentary side view, partly in section, showing a nozzle fitted with a skirt of flexible material being in its initial tucked-in position at the right sectoned half of the figure, and fully extended in the left hand half of the figure.

Figure 6:
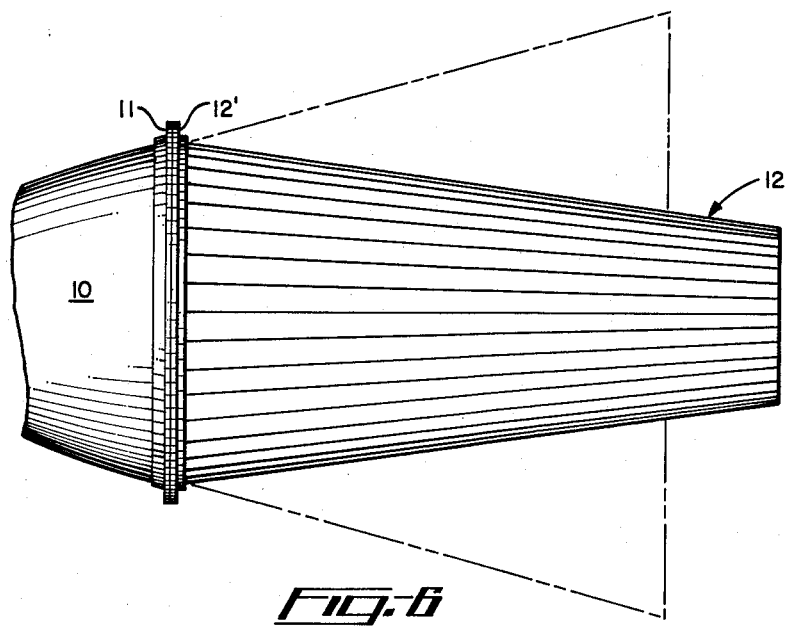
FIG. 6 is a side view showing another design version of an adjustable rocket engine nozzle.

Referring now to FIG. 1, the numeral 10 indicates the fixed portion of a rocket engine nozzle fitted with an exterior peripheral flange 11 at its outlet end. An expandable nozzle portion or skirt generally indicated by numeral 12 is fitted at its forward end to a mounting flange 12' which may be bolted or otherwise secured to flange 11.

Nozzle portion or skirt 12 is formed as a cylindrical member from a material which is highly flexible and easily bent or folded. The material may be metallic or non-metallic but it, nevertheless, should have sufficient strength to carry the nozzle pressure loads during rocket firing. In selecting a material having sufficient strength to withstand loads during rocket firing, use is made of the fact that the nozzle wall automatically becomes structurally stiffened by virtue of outwardly directed pressure difference across the wall. An outwardly directed pressure exists forward of the transverse plane where the internal pressure equals the external ambient pressure. Aft of this point the pressure difference is inward and the nozzle collapses and does not transmit any loads to the rocket if the wall is infinitely flexible. Therefore, the material should have sufficient strength so that the portion of the nozzle wall aft of the point where internal pressure equals external ambient pressure will not be collapsed.

It has been found that thin metal such as tungsten or tantalum may be used for high temperature work or stainless steel or titanium for lower temperatures for instance up to 2000° F. The thickness of the metal may be from .001" to .250" according to the size and power of the rocket.

As best seen in FIG. 4 the expandable nozzle is fabricated from corrugated material 13. It can be appreciated that when the rocket nozzle reaches high altitudes where the gas pressure within the nozzle exceeds the external ambient pressure, the pressure difference across the corrugated wall of the nozzle is outward. Hence the outward pressure will act against the corrugated nozzle wall 13 and will expand the corrugated wall until the corrugations virtually disappear as seen in FIG. 3. The corrugated wall will be expanded more at the rear of the nozzle 12 than at the forward end, as seen in dotted lines in FIG. 1, resulting in a conically shaped nozzle since the wall will have less strength to withstand pressure loads at the rear of the nozzle than at the front end adjacent the fixed nozzle portion 10. It is seen, therefore, that this design permits the nozzle area ratio to increase automatically as the atmospheric pressure decreases. In the nozzle shown the corrugations number 40, about 2″ deep, rolled into a cylinder designed to open from a contracted diameter of 28″ to an expanded diameter of 72″ at the exhaust end. It will of course be understood that the specific details are given by way of example only and the invention is not limited to them.

The cylinder of corrugated sheet 13 may be assembled with flange 12′ by pressing the forward end into flange 12′, then forcing an inner ring 14 (FIG. 2) against the inside of the corrugated cylinder to deform the forward end against the mounting flange 12′, after which the mounting assembly may be brazed into a unitary part.

In order to provide for stiffening and/or cooling the adjustable nozzle a variety of expedients may be employed.

For most conditions a satisfactory solution to the structural problem is obtained merely by adjusting the wall thickness of the pressure stabilized curved sheet. Using metallic walls, cooling is obtained by radiation from the hot walls to the cooler environment around the rocket.

A more complex solution to the problem of stiffening the nozzle is to weld straight lengths of thin walled tubing 15 longitudinally to the inner surface of the nozzle similarly to the tubing arrangement shown in FIG. 3. This tubing arrangement provides a combination of convection and radiation cooling and would handle heat transfer conditions which are too severe for pure radiation cooling alone. For the cases where the heat transfer rate is even higher, the cooling must be accomplished by convection cooling techniques and/or film cooling almost exclusively. Film cooling refers to the technique of spraying coolant fluid onto the inside wall surface. Convection cooling refers to coolant flowing inside of coolant tubes. For a convection cooled expandable nozzle, the tubes would be arranged very close together so as to adequately cool all surfaces.

The tubing 15 is welded to the inner surface of the corrugated material 13 of the nozzle. The tubing is arranged in groups 16 of U form units 17 connected to the adjacent units at their outer and inner ends so that each group of five provides a continuous conduit from an inlet 18 to an outlet 19. As shown in FIG. 2 an inlet manifold 20 supplied with cooling medium by any suitable means and encircling the rearward end of the fixed portion of the nozzle 10 is connected through flexible jumper tubes 22 to inlet ends 18 of each group 16 of tubes. An outlet manifold 23 positioned against manifold 22 is similarly connected by jumper tubes 24 to outlets 19 of each group 16 of the tubes 17. Cooling medium, which in the case of liquid propellant rockets may be either the liquid fuel or oxidizer, or gas which is further used for other purposes such as pressurization of the rocket propellant tanks, may be circulated through the tubing 15 to cool the adjustable nozzle while in the case of a solid fuel rocket the cooling medium may be liquid or gas especially provided for this purpose.

In the embodiment of the expandable nozzle shown in FIG. 5 a fixed portion 25 of a rocket engine nozzle is fitted with a flared skirt 26 of flexible heat resistant material such as reinforced rubber produced under the trademark GEN-Gard by The General Tire and Rubber Company or sheet asbestos reinforced with Inconel wire and impregnated with an ablative material such as Teflon.

The skirt 26 has an upturned portion 26′ clamped between a peripheral flange 27 on the outer surface of the fixed nozzle part 25 and a ring 28 by machine screws or bolts 29 and the free end of the skirt is tucked into the rear end of the fixed nozzle portion 25. The skirt material is thin and limp so that it may be laid against the inside face of nozzle portion 25, creases 30 projecting inwardly taking up the slack due to the greater diameter of the outer end of skirt 26 than of the fixed portion of nozzle 25 against which the inturned skirt is laid.

Firing of the rocket motor is effective to eject the tucked in portion of the skirt 26 after which the ambient pressure acting against the pressure of the exhaust issuing from the nozzle will determine the degree of opening of the skirt.

It should be appreciated that the flexible non-metallic skirt of the nozzle in FIG. 5 may also be bent up around the outside of the rigid nozzle section; however, in such a design the firing of the rocket chamber does not automatically open up the flexible section. Therefore, an auxiliary device would have to be used to pull the flexible nozzle backwards so that the rocket gas pressure could open it up.

Many variations of folding techniques are possible with the non-metallic flexible skirts.

Cooling of the skirt 26 may be secured for a limited time by radiation as well as spraying an ablative coating such as "Teflon" on the material of the skirt during fabrication or by impregnating the material of the skirt therewith.

Referring now to FIG. 6, wherein the same numerals as used in FIG. 1 indicate corresponding parts, there is shown an additional embodiment of the invention wherein the corrugated rocket nozzle has a tapered configuration. When fully expanded the corrugations will virtually disappear and the resulting expanded nozzle will be generally bell-shaped. The number of corrugations used can vary with the particular application requirements.

Figure 7:
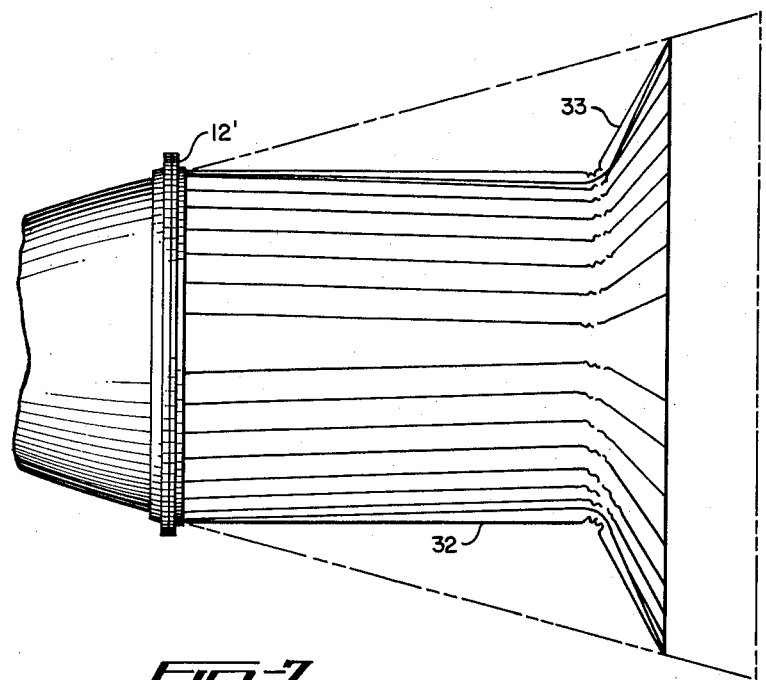
FIG. 7 is a side view of a rocket engine nozzle similar to that shown in FIGS. 1 and 6 except embodying still a different design.
Figure 8:
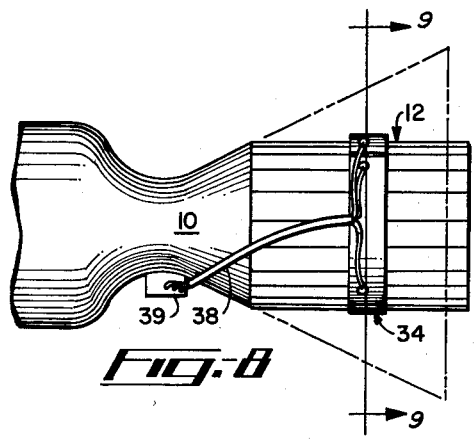
FIG. 8 is a side view of the adjustable rocket nozzle illustrated in FIG. 1 with a segmental thrust vector control strap thereon, the full lines showing the nozzle in retracted position and dotted lines indicating the fully expanded position.
Figure 9:
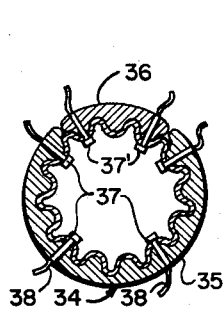
FIG. 9 is a section on line 9—9 of FIG. 8 showing the nozzle in its retracted position.

Occasionally special packaging requirements make it desirable to use configurations as shown in FIG. 7. Starting out with a generally cylindrical corrugated shape 32 the downstream end 33 thereof can be used to flare outwardly from the centerline, thus causing an overall reduction of length of the nozzle, yet the nozzle will obtain a generally conical shape when expanded as seen in dotted lines in FIG. 7. Alternately, the downstream end 33 could be caused to bend inwardly. The flared end 33 will cause some wrinkles in the wall material which will be forced back into an approximately smooth condition by the heat and pressure from the nozzle gases.

Thrust vector deflection may be obtained with the adjustable nozzle of the present invention by providing a means for retaining a portion of the expandable nozzle in a retracted position while the remainder of the nozzle is in its expanded position. One embodiment of a thrust vector control device which may be utilized with the present expandable nozzle is illustrated in FIGS. 8–11, which illustrate a fixed nozzle portion 10 and expandable nozzzle 12 similar to that illustrated in FIG. 1.

The thrust vector control device, which is generally indicated by numeral 34, comprises a segmented strap, two segments 35 and 36 being shown, but it should be understood that any number of segments could be provided. The segments 35 and 36 have their internal diameter shaped so as to conform to the configuration of the corrugated expandable nozzle 12 so that the entire nozzle will be retained in a retracted position until the straps are released therefrom. The segments are releasably secured to the expandable nozzle 12 by any suitable releasable connecting means, such as explosive bolts 37 and 37′. Leads 38 from the explosive bolts extend to a control device 39 on the fixed portion 10 of the nozzle. The control device 39 may be operated by inertial guidance or radio signals or by any other suitable means as well known in the rocket art. The control 39 should be arranged so that the explosive bolts 37 and 37′ connected to the segments 35 and 36, respectively, may be selectively fired so that either the segment 35 or segment 36 may be released from the expandable nozzle 12.

Figure 10:
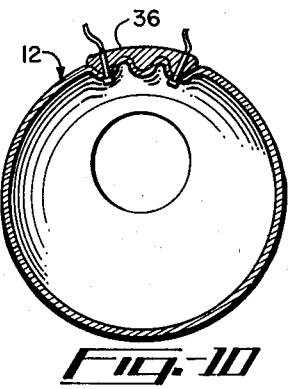
FIG. 10 is a section similar to FIG. 9 but showing part of the nozzle expanded and the remainder constrained by a segment of the thrust vector control strap.
Figure 11:
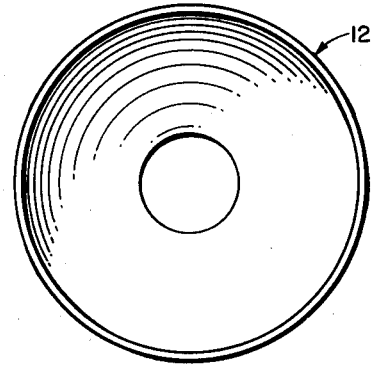
FIG. 11 is an end view of the nozzle shown in FIG. 9 in fully expanded position with the entire thrust vector control strap released.

In operation, in order to obtain thrust vector control, once the nozzle of the rocket motor reaches a predetermined altitude the control 39 may be operated so as to detonate the explosive bolts 37 fixed to the segment 35 thereby causing the segment to be released from the rocket nozzle 12, which will result in the corrugated nozzle 12 obtaining an asymmetric configuration as shown in FIG. 10. As seen in this figure, the strap segment 36 remains on the nozzle 12 and restricts that side of the nozzle from expanding until the control 39 is operated to cause the segment 36 to be released thereby permitting the entire corrugated nozzle 12 to expand so that a symmetric exit will be provided for the rocket nozzle, as shown in FIG. 11. This arrangement would be useful on an air launched missile which must suddenly pitch up in front of the launching aircraft. It can be appreciated that when the missile is launched with the adjustable nozzle 12 restrained 360° about its periphery the missile will move in a straight path ahead of the aircraft. Then when the segment 35 is released from the expandable nozzle 12 leaving only the segment 36 of the strap attached to the bottom portion of the nozzle, the nozzle will assume an asymmetric configuration thereby causing a sharp pitch-up maneuver of the rocket. When the rocket reaches the correct climb angle the remaining segment 36 of the thrust vector control device is released and the missile will follow its normal ballistic path.

Figure 12:
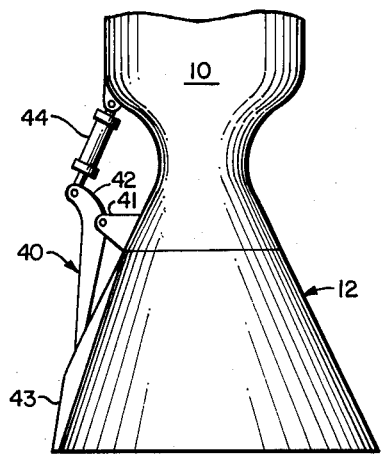
FIG. 12 is a side view similar to FIG. 8 but showing another thrust vector control device on a nozzle in its expanded position.
Figure 13:
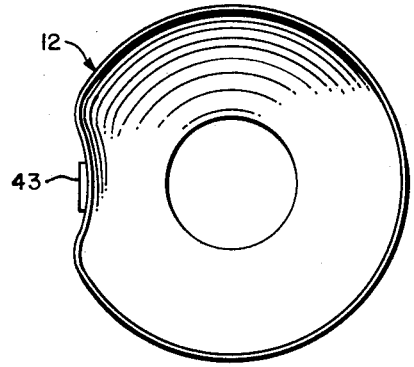
FIGS. 13 and 14 are end views of FIG. 12 showing the thrust vector control device in operative and inoperative positions, respectively.
Figure 14:
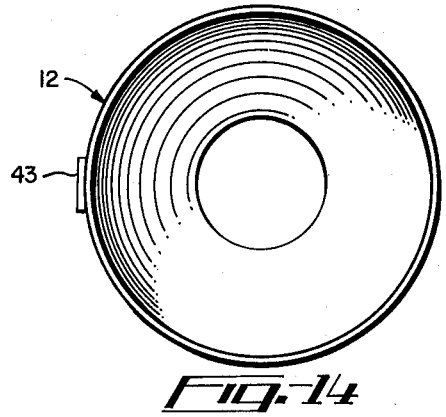

Another thrust vector control device is illustrated in FIGS. 12–14. As most clearly seen in FIG. 12, the thrust vector control device generally indicated by numeral 40 is mounted on the fixed portion 10 of a rocket nozzle. The device comprises a support member 41 with a lever arm 42 pivotally mounted thereon. A deformation pad 43 is fixedly mounted to the end of the lever arm 42 and is positioned so as to engage the exterior of the nozzle 12 and restrain the corrugated nozzle from expanding along a short circumferential portion thereof, it being understood that FIGS. 12 and 13 show the corrugated nozzle 12 in its expanded position except for that portion engaged by the deformation pad 43. In order to release the deformation pad from the expandable nozzle 12 and thereby permit the nozzle to obtain its symmetric configuration as shown in FIG. 14 there is provided an actuator 44 fixed to the combustion chamber of the rocket motor and to the lever arm 42. The actuator may be either hydraulic or electric and, like the control device 39 shown in FIGS. 8–11, this actuator may be operated by radio signals etc. so that a selective movement of the lever arm may be obtained. It can be appreciated that when the actuator 44 is operated it will pivot the lever arm 42 about the support member 41 thereby moving the deformation pad 43 outwardly from the longitudinal axis of the rocket nozzle to the position shown in FIG. 14 so that the expandable nozzle 12 will be able to obtain its symmetric configuration.

The provision of an expandable nozzle has many practical advantages in addition to those previously referred to. For instance in the case of rockets carried by airplanes, the air drag is reduced compared to that caused by rockets fitted with nozzles of usual configuration.

The reduced diameter of the nozzle fitted with the expandable portion as compared with the usual rigid form of nozzle enables a larger nozzle opening in flight to be obtained and permits use of larger combustion chambers under smaller pressure in the chamber with reduction in weight of the pressurized components, thus making it particularly advantageous for use under vacuum conditions.

The expandable corrugated skirt of the adjustable nozzle of the invention is also adapted for use with the exhaust structure of special types of combustion chambers designed for vacuum operation and having a number of co-planar pressure fed burners grouped within a wide mouthed chamber; in this case the corrugated skirt is secured at its forward end to the lower edge of the chamber and in its retracted position extends around the fuel tank of a lower stage which is dropped after firing, thus leaving the corrugated skirt to be expanded on ignition of the pressure burners to serve as an automatically adjustable nozzle for the upper stage.

The automatically expandable nozzle of the invention is light in weight, free of any working parts, and inexpensive to fabricate. Also, it may be cooled by radiation or by circulating liquids or gases through tubular conduits serving also to take axial stresses, or by spraying liquid propellants against the inner surface of the nozzle in flight, or making a flexible nozzle from heat resistant material impregnated with ablative material.

Specific preferred embodiments of the invention have been described and shown herein by way of illustration and explanation of the invention, but not as limitative of the scope of the invention since various changes and modifications may be made in the described embodiment by those skilled in the art without departing from the scope of the invention as defined by the appended claims.

I claim:
1. An automatically adjustable nozzle for a rocket comprising a fixed diameter part adapted to surround the outlet of a combustion chamber of a rocket motor, an elongated tubular skirt secured at its forward end to said fixed diameter part and extending rearwardly therefrom, the wall of said skirt having a plurality of longitudinally extending corrugations provided therein to form corrugated inner and outer skirt surfaces, said skirt extending clear of obstructions and being unconfined throughout at least a major portion of its length, and the wall of said skirt expanding by lessening the extent of the corrugations provided therein in response to a reduction in the ambient atmospheric pressure during the flight of the rocket.

2. An automatically adjustable nozzle as set forth in claim 1 including a plurality of thin walled tubes secured longitudinally to the inner surface of said skirt to transmit axial forces acting on the nozzle to the motor.

3. An automatically adjustable nozzle as set forth in claim 2 in which a cooling medium fills said tubes.

4. An automatically adjustable nozzle as set forth in claim 1 and in addition, a plurality of thin walled metal tubes attached together along their longitudinal mating surfaces and secured to the radially inwardly disposed portion of the corrugated inner surface of said skirt.

5. An automatically adjustable nozzle as set forth in claim 1 and, in addition, said skirt having a rear end portion flared outwardly from the longitudinal axis of said nozzle.

6. An automatically adjustable nozzle for a rocket comprising a fixed diameter part adapted to surround the outlet of a combustion chamber of a rocket motor, a bendable skirt means secured at its forward end to and around said fixed diameter part and extending rearwardly therefrom, said bendable skirt means being movable from a retracted to an expanded position as the ambient atmospheric pressure is reduced during the flight of the rocket, and thrust vector control means associated with said bendable skirt means, said thrust vector control means retaining a portion of said bendable skirt means in its retracted position while the remainder of said bendable skirt means is in its expanded position.

7. An automatically adjustable nozzle as set forth in claim 6 wherein said thrust vector control means comprises a segmented strap surrounding said bendable skirt means, means releasably securing said segmented strap to said bendable skirt means, and means for selectively releasing segments of said segmented strap from said bendable skirt means.

8. An automatically adjustable nozzle as set forth in claim 6 wherein said thrust vector control means comprises an arm pivotally mounted on said bendable skirt means, said arm having one end engaging an exterior portion of said bendable skirt means so as to restrain said bendable skirt means from expanding, and means connected to said pivoted arm for selectively moving said one end of said pivoted arm outwardly from the longitudinal axis of said rocket motor.

References Cited by the Examiner

UNITED STATES PATENTS

| | | | |
|---|---|---|---|
| 2,569,996 | 10/1951 | Kollsman | 60—35.6 |
| 2,593,420 | 4/1952 | Diehl | 60—35.6 |
| 2,608,820 | 9/1952 | Berliner | 60—35.6 |
| 2,634,578 | 4/1953 | Kallal | 60—35.6 |
| 2,658,333 | 11/1953 | Smialowski | 60—35.6 |
| 2,666,291 | 1/1954 | Skorecki | 60—35.6 |
| 3,048,972 | 8/1962 | Barlow | 60—35.6 |
| 3,066,702 | 12/1962 | Tumavicus | 60—35.6 |

MARK NEWMAN, *Primary Examiner*.

ABRAM BLUM, SAMUEL LEVINE, *Examiners*.